(12) United States Patent
Weschler

(10) Patent No.: US 6,470,332 B1
(45) Date of Patent: Oct. 22, 2002

(54) SYSTEM, METHOD AND COMPUTER PROGRAM PRODUCT FOR SEARCHING FOR, AND RETRIEVING, PROFILE ATTRIBUTES BASED ON OTHER TARGET PROFILE ATTRIBUTES AND ASSOCIATED PROFILES

(75) Inventor: Paul Weschler, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/314,690

(22) Filed: May 19, 1999

(51) Int. Cl.[7] .............................................. G06F 17/30
(52) U.S. Cl. ........................ 707/3; 707/103 Y; 709/226
(58) Field of Search .......................... 707/10, 3, 5, 513, 707/103 R, 103 Y, 9, 104.1; 379/219; 709/226–227, 245, 156; 713/156; 370/241, 256

(56) References Cited

U.S. PATENT DOCUMENTS

| | | | |
|---|---|---|---|
| 6,014,711 A | * 1/2000 | Brown | 709/245 |
| 6,016,499 A | * 1/2000 | Ferguson | 707/104 |
| 6,052,681 A | * 4/2000 | Harveys | 707/3 |
| 6,085,188 A | * 7/2000 | Bachmann et al. | 707/3 |
| 6,134,550 A | * 10/2000 | Van Oorchot et al. | 707/9 |
| 6,175,836 B1 | * 1/2001 | Aldred | 707/103 R |
| 6,192,362 B1 | * 2/2001 | Schneck et al. | 707/10 |
| 6,199,062 B1 | * 3/2001 | Byrne et al. | 707/3 |
| 6,236,988 B1 | * 5/2001 | Aldred | 707/102 |

OTHER PUBLICATIONS

Henning Maass, "Location–aware mobile applications based on directory services", ACM Press, NY, USA, 1997, pp. 23–33.*

Henning Maass, "Location–aware mobile applications based on directory services", ACM Press, NY, USA, 1998, pp. 157–173.*

Article Lightweight Directory Access Protocol (v3), by M. Wahl et al., Dec. 1997.

Article "Lightweight Directory Access Protocol (v3) Extensions for Dynamic Directory Services" By Y. Yaacovi et al., May 1999.

* cited by examiner

*Primary Examiner*—John Breene
*Assistant Examiner*—Mohammad Ali
(74) *Attorney, Agent, or Firm*—William J. Kubida; Stuart T. Langley; Hogan & Hartson LLP

(57) ABSTRACT

A system, method and computer program product for searching for, and retrieving, profile (or directory) attributes based on other attributes of the target profile and that of associated profiles. In a specific implementation, the LDAP RFC 2254 string search syntax may be utilized to allow multiple related search filters to be specified at one time. The first of the sequence of query strings defined is used as a filter to retrieve candidate results and the succeeding filters, or query strings, are used to determine if a specific profile or directory should even be considered.

36 Claims, 4 Drawing Sheets

SYSTEM, METHOD AND COMPUTER PROGRAM PRODUCT FOR SEARCHING FOR, AND RETRIEVING, PROFILE ATTRIBUTES BASED ON OTHER TARGET PROFILE ATTRIBUTES AND ASSOCIATED PROFILES

BACKGROUND OF THE INVENTION

The present invention relates, in general, to the field of computer systems and methods for implementing the same. More particularly, the present invention relates to a system, method and computer program product for searching for, and retrieving, profile (or directory) attributes based on other attributes of the target profile and that of associated profiles.

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network ("LAN"). In such systems powerful server computers (e.g., application servers and file servers) are used to process and access data. The requested data is then transmitted to the client computer for further processing. To scale to larger networks, multiple LANs may be inter-networked using, for example, leased data lines to create a wide area network ("WAN"). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as file servers for sharing data with other client computers. Each software application running on the client, or the client's operating system ("OS") may save client specific configuration data that is used by the client to fine-tune and define the user's software environment at runtime.

As used herein, the term "profile information" refers to any information or metadata used by a particular piece of hardware, software application, or operating system to configure a computer. The profile information may be associated with a particular application or group of applications, a particular hardware device or group of devices, as well as a particular user or group of users. Some operating systems store user profile information that is used during boot operations application start-up to tailor a limited number of the system characteristics to a particular machine user. However, this profile information is closely tied to a single machine and operating system. As a result, the profile information is not useful to a new user the first time that user logs onto a particular machine. Moreover, this information is not available to remote users that are accessing the LAN/WAN using remote access mechanisms.

Existing mechanisms tend to focus on a single type of profile information—user information, application information or hardware information. Also, because these mechanisms are very application specific they limit the number and type of attributes that can be retained. Further, the profile information is isolated and fails to indicate any hierarchical or relational order to the attributes. For example, it may be desirable that a user group is required to store all files created using a particular application suite to a specific file server. Existing systems, if such a service is available at all, must duplicate profile information in each application program merely to implement the required file storage location preference. Storage location direction based on a user-by-user or user group basis is difficult to implement and may in fact require a shell application running on top of the application suite. Even then, the system is not extensible to access, retrieve, and use profile information for a new user that has not used a particular machine before.

As in the example above, existing systems for storing configuration information lead to duplicative information stored in many locations. Each application stores a copy of its own configuration information, as does each hardware device and each user. Much of this information is identical. It is difficult to maintain consistency among these many copies in distributed data environments. For example, when the specified file storage location changes, each copy of the configuration information must be changed. The user or system administrator must manually track the location and content of each configuration file. An example of the inefficiencies of these types of systems is found in the Windows 95 registry file that holds profile information but has an acknowledged tendency to bloat over time with duplicative and unused data. Moreover, the registry file in such systems is so closely tied to a particular machine and instance of an operating system that it cannot be remotely accessed and used to configure other computers or devices. Hence, these systems are not generally extensible to manage multiple types of profile information using a single mechanism. A need therefore, exists for profile information that is readily accessible to all machines coupled to a network and to machines accessing the network through remote access mechanisms.

Peer-to-peer type networks are an evolutionary change to client/server systems. In a peer-to-peer network each computer on the LAN/WAN can act as a server for applications or data stored on that machine. A peer-to-peer network does not require, but is able to, run alongside a client/server system. Peer-to-peer architectures offer a potential of reduced complexity by eliminating the server and efficient use of resources available in modern client and workstation class computers. However, peer-to-peer networks remain dependent on a secure, closed network connection to implement the LAN/WAN which is difficult to scale upwardly.

Peer-to-peer solutions also do not scale well because as the network becomes larger it becomes increasingly difficult to identify which peer contains the applications and data needed by another peer. Moreover, security becomes more difficult to manage because the tasks of authorizing and authenticating users is distributed among the peer group rather than in a centralized entity. A need exists for a system and method that enables a peer-to-peer architecture to scale without reduced performance, ease of use, and security.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a hand-held computer, or a data appliance such as a cellular phone or the like. A user may, for example, use a full featured e-mail application to access e-mail while working from a workstation but prefer a more compact application to access the same data when using a hand-held computer or cellular phone. In each case, the network desirably adapts to the changed conditions with minimal user intervention.

In order to support mobile users, the client/server or peer-to-peer network had to provide a gateway for remote access. Typically this was provided by a remote access server coupled to a modem. Remote users would dial up the modem, comply with authorization/authentication procedures enforced by the server, then gain access to the network. In operation the mobile user's machine becomes like a "dumb terminal" that displays information provided to it over the dial-up connection, but does not itself process data. For example, a word processing program is actually executing on the remote access server, and the remote user's machine merely displays a copy of the graphical user interface to the remote user. The remote user is forced to use the configuration settings and computing environment implemented by the remote access server. A need therefore, exists for a method and system for remote access that enables the remote user to process data on the remote machine without being confined to using configuration settings imposed by a remote access server.

There is increasing interest in remote access systems that enable a user to access a LAN/WAN using a public, generally insecure, communication channels such as the Internet. Further, there is interest in enabling LANs to be internetworked using public communication channels. This is desirable because the network administrator can provide a single high speed gateway to the Internet rather than a remote server/modem combination for each user and expensive WAN communication lines. The Internet gateway can use leased lines to access the Internet rather than more costly business phone lines. Also, the Internet gateway can be shared among a variety of applications and so the cost is not dedicated solely to providing remote access or wide area networking. The reduction in hardware cost and recurrent phone line charges would be significant if remote users could access the LAN/WAN in this manner.

In an enterprise system it is critical that distributed resources remain available. Access to profile information is often prefatory to using a particular system or software application for meaningful work. High availability is accomplished in most instances by replicating critical resources and managing the replicas so that they remain consistent. Replication leads to difficulties in keeping the replicas consistent with each other. This is particularly true for profile type information that may be controlled by or owned by a variety of entities. For example, a user may own profile information related to that user's preferences, passwords, and the like. However, a workgroup administrator may own profile information related to group membership, group security policies, and the like. Further still, individual applications may own profile information describing that application's configuration operations. In an environment where any entity can change the information contained in any profile that it owns at any time, it quickly becomes an intractable problem to maintain consistency among multiple replicas. A need exists for a system and methods for maintaining profile information owned by a diverse set of entities in a highly available manner.

From a network user's perspective these limitations boil down to a need to manually configure a given computer to provide the user's desire computing environment. From a remote user's perspective these limitations require the user to manually reconfigure the remote access computer to mimic the desired computing environment or tolerate the generic environment provided by default by the remote access server. From a network administrator's perspective, these complications require software and operating systems to be custom configured upon installation to provide the desired computing environment. In each case, the time and effort consumed simply to get "up and running" is a significant impediment to efficient use of the distributed computing environment. What is needed is a system that readily adapts to a changing, heterogeneous needs of a distributed network computing environment.

One solution to the problem of finding resources in a distributed system is to use directories. Directories are data structures that hold information such as mail address book information, printer locations, public key infrastructure ("PKI") information, and the like. Because of the range of functions and different needs of driving applications, most organizations end up with many different, disparate directories. These directories do not interact with each other and so contain duplicative information and are difficult to consistently maintain.

Meta-directories are a solution that provides directory integration to unify and centrally manage disparate directories within an enterprise. A meta-directory product is intended to provide seamless integration of the multiple disparate directories. However, existing solutions fall short of this seamless integration because the problems to be solved in directory integration are complex. Meta-directory solutions are not sufficiently extensible to account for the wide variety of resources available on a network. In the past, meta-directory technology has not been used to catalog metadata of sufficiently general nature to meet the needs of a dynamically growing and changing distributed computing environment.

X.500 is one current model for managing on-line directories of users and resources (Directory Services) that includes the overall namespace as well as the protocol for querying and updating it. An X.500 directory is called a Directory Information Base ("DIB") and the program that maintains the DIBs is called a Directory Server Agent ("DSA"). A Directory Client Agent ("DCA") is used to search DSA sites for names and addresses.

The protocol generally used in conjunction with X.500 is the "DAP" (Directory Access Protocol) and it operates over the OSI (Open System Interconnection) network protocol stack. Due to the fact that a full DAP client is difficult to implement on smaller computer systems, the LDAP, (Lightweight Directory Access Protocol) was developed.

Like X.500, LDAP is both an information model and a protocol for querying and manipulating it and the overall data and namespace model is essentially that of X.500. A fundamental difference between DAP and LDAP is that the latter protocol is designed to run directly over the TCP/IP (Transmission Control Protocol/Internet Protocol) stack, and it lacks some of the DAP protocol functions such as security. In operation, LDAP enables a user to locate organizations, individuals, and other resources such as files and devices in a network, whether on the Internet or on a corporate intranet.

In a network, a directory is used to indicate where in the network something is located. On TCP/IP networks (including the Internet), the Domain Name System ("DNS") is the directory system used to relate the domain name to a specific network address or unique location on the network. If the domain name is not known, LDAP allows a user to initiate a search for, for example, an individual without knowing exactly where he is located. Simply stated, an LDAP directory is organized in a simple "tree" hierarchy and may consist, for example, of the following levels:

The "Root" directory (the starting place or the source of the tree), which branches out to Countries, each of which branches out to Organizations, which branch out to Organizational units (divisions, departments, and so forth), which branches out to (includes an entry for)

Individuals (which includes people, files, and shared resources such as printers) =An LDAP directory can be distributed among many servers, and each server can have a replicated version of the total directory that is synchronized periodically. When an LDAP server receives a request from a user, it takes responsibility for the request, passing it to other DSAs as necessary, but nevertheless ensuring a single coordinated response for the user.

The current LDAP protocol is specified in RFCs (Request For Comments) 1777 and 1778 while the string representation of LDAP search filters is specified in RFC 2254.

SUMMARY OF THE INVENTION

Disclosed herein is a system and method for searching for and retrieving profile attributes based on other attributes of the target profile and that of associated profiles. The present invention advantageously enhances the LDAP RFC 2254 search mechanism to base results not only on the attributes of a specific profile (or directory) but also on related profiles (or directories).

The LDAP RFC 2254 string search syntax may be utilized but it is enhanced and extended in that the profile search mechanism herein disclosed allows multiple related search filters to be specified at one time. The top most filter is used to retrieve results and the succeeding filters are used to determine if a specific profile should even be considered.

Particularly disclosed herein is a method and a computer program product for searching directories in a computer system comprising the steps of specifying a sequence of query strings for the directories, applying each of the sequence of query strings to the directories, determining candidate ones of the directories comprising matches to a first of the sequence of query strings, iteratively applying remaining ones of the sequence of query strings to the candidate ones of the directories and returning a result set of data representative of the candidate ones of said directories having matched each of the specified sequence of query strings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
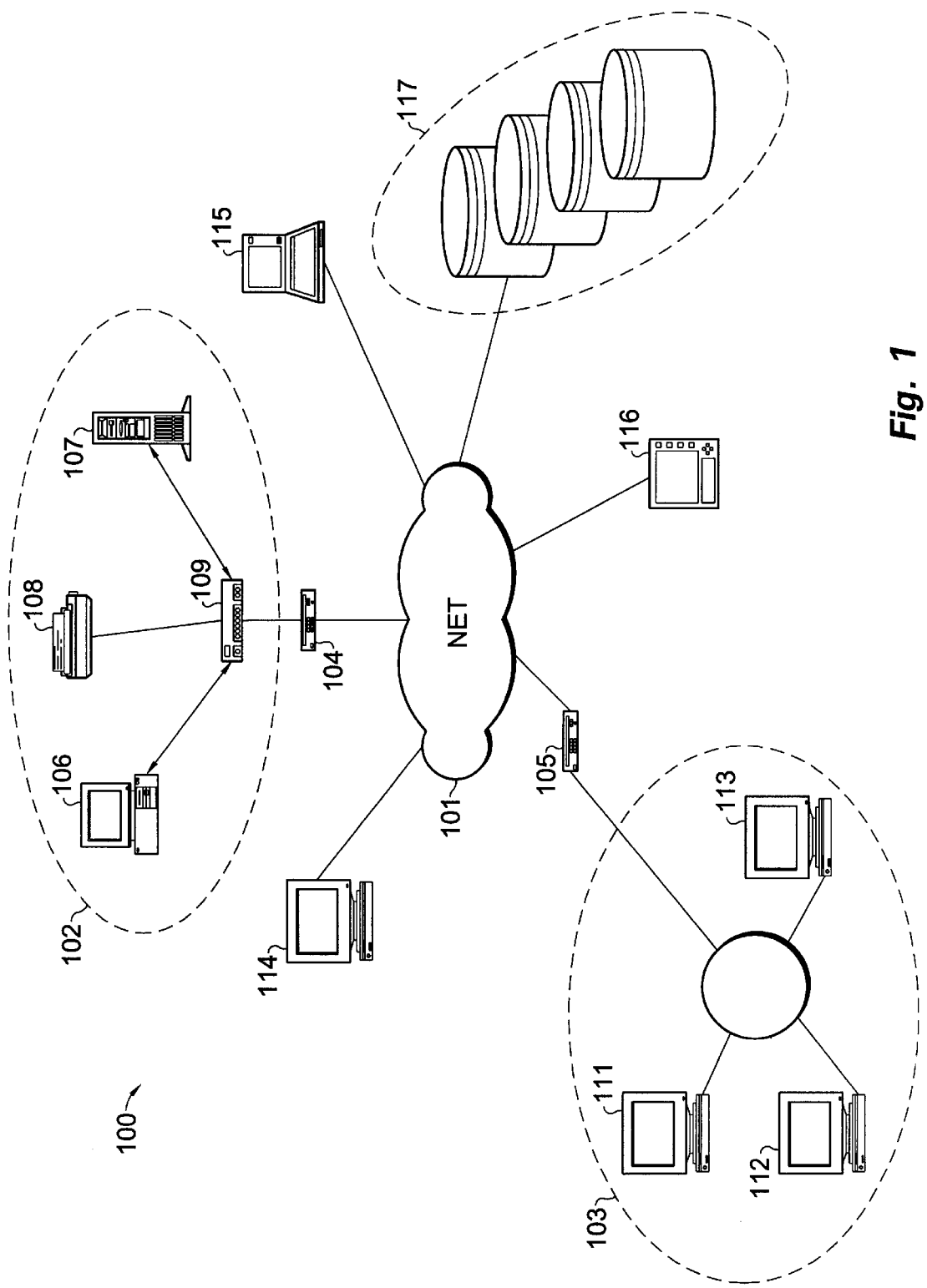
FIG. 1 illustrates a representational network computing system and operating environment for performing the computer implemented steps of a method in accordance with the present invention.

With reference now to FIG. 1, the present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments as well as small network environments such as conventional local area network ("LAN") systems.

It is contemplated that the present invention will be particularly useful in environments that require a data structure that is quickly searched and where the data is suited to a hierarchical representation. Also, the system of the preferred implementation is designed to store and make available relatively compact units of data that serve to configure (i.e. startup, return decisions, shutdown) devices and computer environments rather than operational or analytical data upon which the computer environment may operate at runtime. Hence, the present invention is particularly advantageously used when it stores and retrieves data that is frequently searched and retrieved, but infrequently changed although it may also be used in conjunction with data that is frequently changed as well.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, Windows NT, Solaris™ (a trademark or registered trademark of Sun Microsystems, Inc. in the United States or other countries) or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional wide area network ("WAN") technologies.

LAN 102 includes one or more workstations such as personal computer ("PC") 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass storage such as disk farm 116.

The computer program product devices in accordance with the present invention include elements that operate in a server, a client or both. It is contemplated that elements may be stored remotely, delivered to a client system on demand by a server computer and executed partially and completely by the server and client. Accordingly, the present invention is not limited by the method of distribution or packaging that a particular application involves. In other words, the present invention may be distributed as client-only software devices, server-only software devices or as system software that is distributed to both client and server devices.

Figure 2:
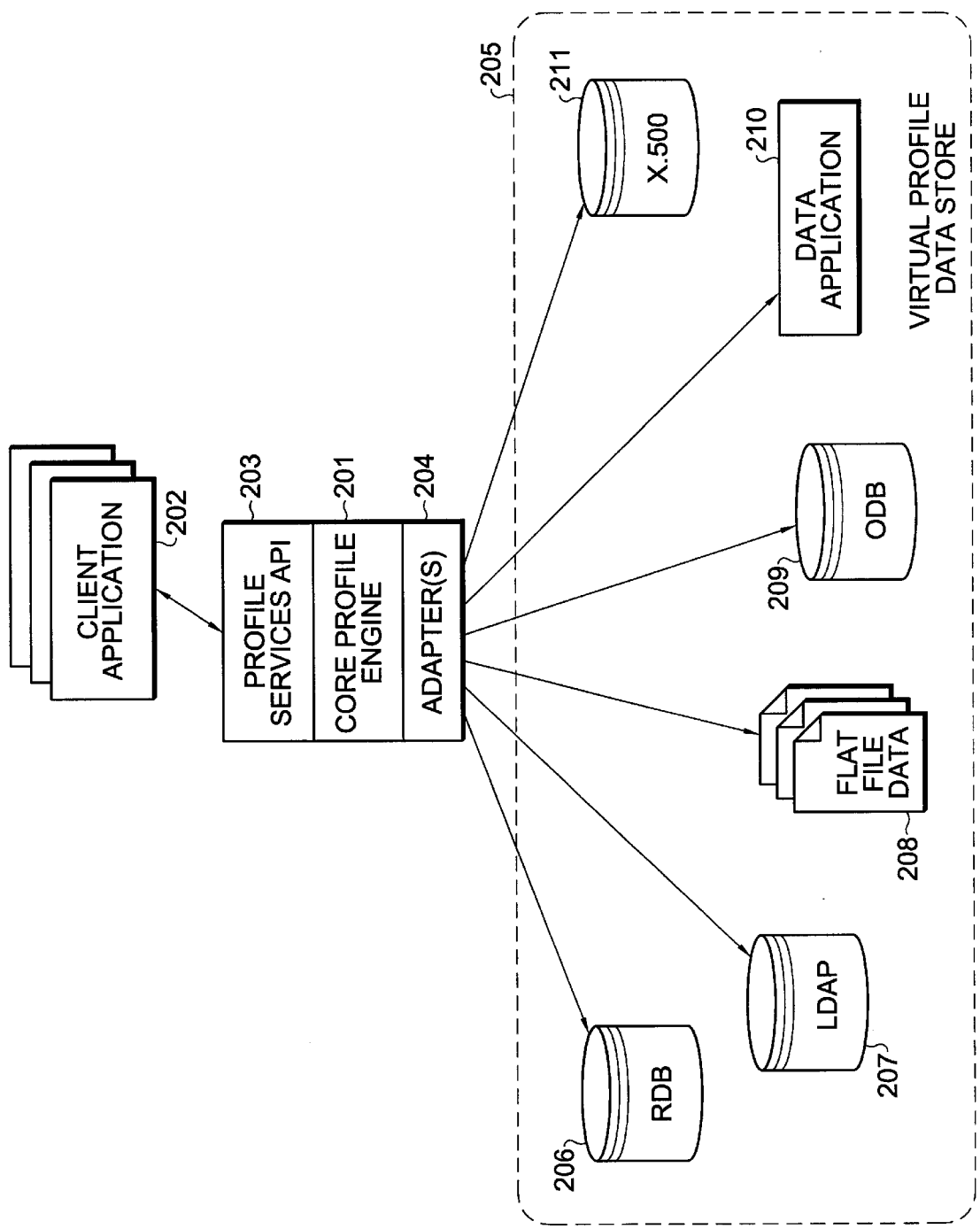
FIG. 2 illustrates a more specific network architecture in which in which the present invention may be employed.

With reference additionally now to FIG. 2, a more specific example of the present invention implemented in a gateway or firewall server such as gateway 104 or gateway 105 in FIG. 1 is shown. The components implemented in a gateway machine include a core profile engine 201 that is accessed by a client application 202 through a profile services application programming interface ("API") 203. API 203 provides an interface that enables client applications that have a corresponding interface to send messages that enable the application to send data and commands to request profile services from core profile engine 201. In a particular implementation the profile services API 203 provides three basic functions. First, the profile services API 203 provides "factory" methods for creating profiles. Second, the profile services API 203 provides search and retrieve methods for accessing existing profiles. Third, the profile services API 203 provides management utilities for defining schemas.

Core profile engine 201 responds to the client application requests by executing requested functions on virtual profile data store 205. Core profile engine 201 maintains a set of metadata about every attribute and binding for every profile. This metadata controls how the profile engine 201 makes the profile data available to client applications 202. This metadata includes, but is not limited to, information regarding owner identity, read-write-modify permissions, group membership, timestamps, triggers, and the like.

Virtual profile data store 205 may comprise a single data storage device, but more often comprises a plurality of disparate, heterogeneous data storage devices. The specific example of FIG. 2 includes a relational database 206, lightweight directory access protocol 207, flat data file 208, object oriented database 209, and X.500 directory 211. An adapter 204 may also access another data application 210 where the data application 210 provides an API compatible with the adapter 204 and operates to access other local and distributed data stores. In a particular implementation, adapter(s) 204 comprise an adapter for each data store device and/or protocol. Each adapter 204 includes an interface to core profile engine 201 and a special purpose interface configured to the specific data store within virtual data store 205 that it is intended to access. Virtual data store 205 includes a dynamically changing number of data store devices as devices can be added, changed, and deleted by modifications to the associated adapter 204.

Figure 3:
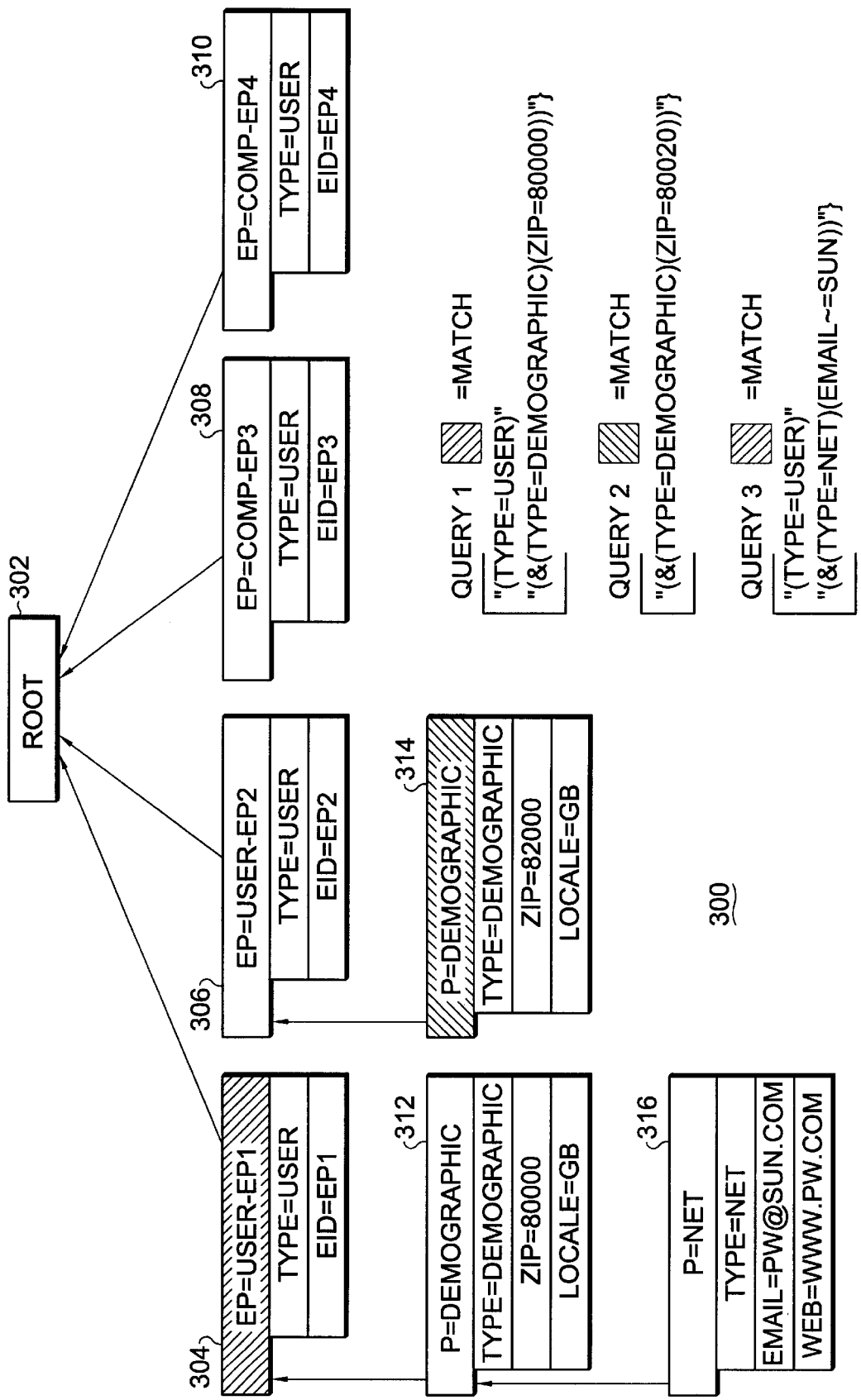
FIG. 3 illustrates a representative profile service search in accordance with the present invention presenting a series of three possible queries and the resultant matches.

With reference additionally now to FIG. 3, a representative profile service search 300 presenting a series of three possible queries (Queries 1–3 inclusive) and the resultant matches is shown. The search 300 and all queries are executed relative to the search root 302 although a search may alternatively specify any profile as the search root.

In the example shown, profile 304 (ep=user-ep1) has the attributes of type=user and eid=ep1; profile 306 (ep=user-ep2) has the attributes of type=user and eid=ep2; profile 308 (ep=comp-ep3) has the attributes of type=user and eid=ep3 and profile 310 (ep=comp-ep4) has the attributes of type=user and eid=ep4. Sub-profile 312 (p=demographic) has the attributes of type=demographic, zip=80000 and locale=gb while sub-profile 314 (p=demographic) has the attributes of type=demographic, zip=82000 and locale=gb. Further sub-profile 316 (p=net) has the attributes of type=net, email=pw@sun.com and web=www.pw.com as shown.

Query 1 specifies a search for "(type=user)" and "(&(type=demographic)(zip=80000))"}. This first query produces a match at profile 304 as shown since the attributes of profile 304 and sub-profile 312 match the specified criteria. Query 2 then specifies a search for "(&(type=demographic)(zip=80020))"} which matches the attributes of sub-profile 314. Query 3 finally specifies a search for "(type=user)" and "(&(type=net)(email~=sun))"} which also produces a match at profile 304 as shown since the attributes of profile 304 and sub-profile 316 match the specified criteria.

As can be seen the queries are executed from the search root or can specify any profile as the search root. Specific attributes can be requested as a return value with access control being checked. If specific attributes are not requested, then the resource identification ("ID") of any matching profiles is returned and access control is not checked. Multiple responses to queries are allowed although a maximum response count may be specified.

Unlike a conventional LDAP query as provided for in RFC 2254, the system and method of the present invention advantageously allows for the specification and execution of a sequence, or series, of LDAP style query strings at one time, with each of the query strings being utilized in a specific way to determine a match. While a conventional LDAP search string can query only a single directory at a time, the system and method of the present invention is operational to execute a first query of a sequence of queries to determine if one or more profiles matches the first query. If one or matches are found, the results then are "candidates" for the next query of the series. Consequently, before any results are reported back for the first query, the subsequent queries proceed further down a "tree" structure in relationship to further profiles relative to any candidate profiles matched initially to determine if they too match the subsequent query strings in the sequence of queries that has been specified.

As shown in the example of FIG. 3, the first query string of a sequence of strings in example Query 1 is executed to find those profiles where the "type" is equal to "user". Profiles 304, 306, 308 and 310 are all candidates. Of these, a match will be found only if their sub-profile has a "type" equal to "demographic" and the zipcode is equal to "80000". The results of this first exemplary query then provides a match on profile 304 and not profiles 306, 308 and 310.

Query 2 illustrates that if a search had instead been performed for a match where the "type" is equal to "demographic" and the zipcode is equal to "82000", then sub-profile 314 would have been matched. That sub-profile alone in the tree structure shown would be returned in this particular example although, of course, a search may actually return multiple matches.

Figure 4:
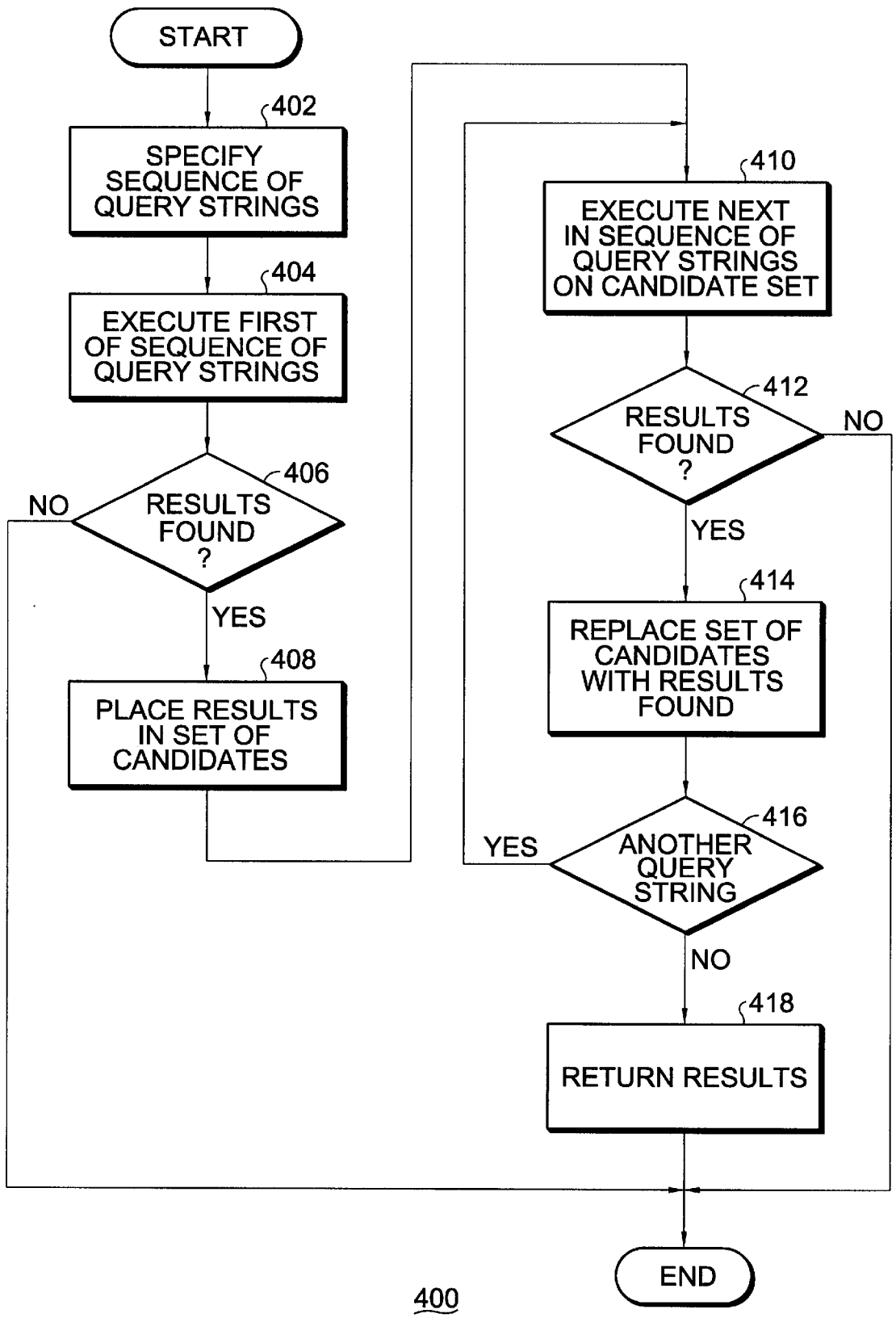
FIG. 4 illustrates a representative profile service search process in accordance with an embodiment of the present invention.

Query 3 is an example of a sequence of query strings which may be executed to find those profiles which first have a "type" equal to "user" (profiles 304, 306, 308 and 310 are all candidates at this point) and a further sub-profile "type" equal to "net" and an electronic mail ("email") address approximately equal to ("~=") "sun". The second query string of the sequence specified in Query 3 then eliminates profiles 308 and 310 as candidates because they have no sub-profiles to provide a match. Sub-profile 314 then eliminates profile 306 due to the fact the second query string of the sequence specifies criteria on which there is no match. Consequently, because sub-profile 316 of candidate profile 304 provides a match on the second query string as well, a match is found on profile 304. A query only on the second query string of example Query 3 (without the first query string of "(type=user)" would have provided a match on sub-profile 316. =With reference additionally now to FIG. 4, an exemplary process flow 400 in accordance with the system and method of the present invention is shown. The process 400 begins with the specification of a sequence of query strings at step 402 as previously described. At step 404 the first of the sequence of query strings is executed and, if results are found at decision step 406, they are placed in a set of candidate profiles (or directories) at step 408. If no results are returned at decision step 406, the process 400 ends. =At step 410, the next in the sequence of query strings is executed on the set of candidates relative to each candidate and, if results are found at decision step 412, the results define a new set of candidates at step 414. Should no results be found, the process 400 ends. If a third (or more) query string is part of the sequence initially defined at step 402, at decision step 416 the process 400 iteratively applies steps 410, 412, 414 and 416 until the last query string has been executed and the results are returned at step 418.

The profile search mechanism of the present invention advantageously allows an arbitrary number of qualifying search filters to be specified. As such, the process of reducing the result set may continue based on the filters specified.

In contrast, the conventional LDAP search mechanism specified in RFC 2254 only allows the evaluation of a single directory.

The profile service utilized in conjunction with the present invention supports two basic functional objects, profiles themselves and a "profile manager". The profile manager interface is alternatively referred to as the profile service interface. Any logical interfaces described are not intended to be literal. Instead, they are intended to articulate the fundamental functional operations that the service supports. All implementations of the profile service desirably support these classes of functions. In addition, individual implementations may support additional methods that are not supported in all implementations to meet the needs of a particular application.

While there have been described above the principles of the present invention in conjunction with specific exemplary implementations it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for searching directories in a computer system comprising:

specifying a sequence of query strings for said directories;

applying each of said sequence of query strings to said directories;

determining candidate ones of said directories comprising matches to a first of said sequence of query strings;

iteratively applying remaining ones of said sequence of query strings to said candidate ones of said directories; and returning a result set of data representative of said candidate ones of said directories having matched each of said specified sequence of query strings.

2. The method of claim 1 wherein said step of specifying is carried out by the step of:

specifying LDAP compliant query strings.

3. The method of claim 1 further comprising the step of:

caching said directories at a local storage device prior to said step of applying.

4. The method of claim 1 wherein said step of applying is carried out by the steps of:

determining a search root of said directories; and executing said sequence of query strings from said search root.

5. The method of claim 4 wherein said step of determining said search root is carried out by the step of:

defining one of said directories as said search root.

6. The method of claim 1 wherein said step of specifying said sequence of query strings further comprises the step of:

requesting specific attributes of said result set as a return value.

7. The method of claim 6 further comprising the step of:

checking access control of a user specifying said sequence of query strings.

8. The method of claim 1 wherein said step of returning said result set further comprises the step of:

producing said data in the form of a resource identification of said result set.

9. The method of claim 1 wherein said step of specifying said sequence of query strings further comprises the step of:

defining a maximum response count for said result set.

10. A computer program product comprising:

a computer usable medium having computer readable code embodied therein for searching directories in a computer system comprising:

computer readable program code devices configured to cause said computer to effect allowing for specifying a sequence of query strings for said directories;

computer readable program code devices configured to cause said computer to effect apply each of said sequence of query strings to said directories;

computer readable program code devices configured to cause said computer to effect determining candidate ones of said directories comprising matches to a first of said sequence of query strings;

computer readable program code devices configured to cause said computer to effect iteratively applying remaining ones of said sequence of query strings to said candidate ones of said directories; and computer readable program code devices configured to cause said computer to effect returning a result set of data representative of said candidate ones of said directories having matched each of said specified sequence of query strings.

11. The computer program product of claim 10 wherein said computer readable program code devices configured to cause said computer to effect allowing for specifying is carried out by computer readable program code devices configured to cause said computer to effect allowing for specifying LDAP compliant query strings.

12. The computer program product of claim 10 further comprising:

computer readable program code devices configured to cause said computer to effect caching said directories at a local storage device.

13. The computer program product of claim 10 wherein said computer readable program code devices configured to cause said computer to effect applying is carried out by:

computer readable program code devices configured to cause said computer to effect determining a search root of said directories; and computer readable program code devices configured to cause said computer to effect executing said sequence of query strings from said search root.

14. The computer program product of claim 13 wherein said computer readable program code devices configured to cause said computer to effect determining said search root is carried out by computer readable program code devices configured to cause said computer to effect defining one of said directories as said search root.

15. The computer program product of claim 10 wherein said computer readable program code devices configured to cause said computer to effect specifying said sequence of query strings further comprises:

computer readable program code devices configured to cause said computer to effect requesting specific attributes of said result set as a return value.

16. The computer program product of claim 15 further comprising:

computer readable program code devices configured to cause said computer to effect checking access control of a user specifying said sequence of query strings.

17. The computer program product of claim 10 wherein said computer readable program code devices configured to cause said computer to effect returning said result set further comprises:

computer readable program code devices configured to cause said computer to effect producing said data in the form of a resource identification of said result set.

18. The computer program product of claim 10 wherein said computer readable program code devices configured to cause said computer to effect allowing for specifying said sequence of query strings further comprises:

computer readable program code devices configured to cause said computer to effect allowing for defining a maximum response count for said result set.

19. A method for searching directories in a computer system comprising:

providing for specifying a sequence of query strings for said directories;

providing for applying each of said sequence of query strings to said directories;

providing for determining candidate ones of said directories comprising matches to a first of said sequence of query strings;

providing for iteratively applying remaining ones of said sequence of query strings to said candidate ones of said directories; and providing for returning a result set of data representative of said candidate ones of said directories having matched each of said specified sequence of query strings.

20. The method of claim 19 wherein said step of providing for specifying is carried out by the step of:

providing for specifying LDAP compliant query strings.

21. The method of claim 19 further comprising the step of:

providing for caching said directories at a local storage device prior to said step of providing for applying.

22. The method of claim 19 wherein said step of providing for applying is carried out by the steps of:

providing for determining a search root of said directories; and providing for executing said sequence of query strings from said search root.

23. The method of claim 22 wherein said step of providing for determining said search root is carried out by the step of:

providing for defining one of said directories as said search root.

24. The method of claim 19 wherein said step of providing for specifying said sequence of query strings further comprises the step of:

providing for requesting specific attributes of said result set as a return value.

25. The method of claim 24 further comprising the step of:
  providing for checking access control of a user specifying said sequence of query strings.

26. The method of claim 19 wherein said step of providing for returning said result set further comprises the step of:
  providing for producing said data in the form of a resource identification of said result set.

27. The method of claim 19 wherein said step of providing for specifying said sequence of query strings further comprises the step of:
  providing for defining a maximum response count for said result set.

28. A system for searching directories in a computer system comprising:
  means for specifying a sequence of query strings for said directories;
  means for applying each of said sequence of query strings to said directories;
  means for determining candidate ones of said directories comprising matches to a first of said sequence of query strings;
  means for iteratively applying remaining ones of said sequence of query strings to said candidate ones of said directories; and
  means for returning a result set of data representative of said candidate ones of said directories having matched each of said specified sequence of query strings.

29. The system of claim 28 wherein said means for specifying comprises:
  means for specifying LDAP compliant query strings.

30. The system of claim 28 further comprising:
  means for caching said directories at a local storage device prior to said step of applying.

31. The system of claim 28 wherein said means for applying comprises:
  means for determining a search root of said directories; and
  means for executing said sequence of query strings from said search root.

32. The system of claim 31 wherein said means for determining said search root comprises:
  means for defining one of said directories as said search root.

33. The system of claim 28 wherein said means for specifying said sequence of query strings further comprises:
  means for requesting specific attributes of said result set as a return value.

34. The system of claim 33 further comprising:
  means for checking access control of a user specifying said sequence of query strings.

35. The system of claim 28 wherein said means for returning said result set further comprises:
  means for producing said data in the form of a resource identification of said result set.

36. The system of claim 28 wherein said means for specifying said sequence of query strings further comprises:
  means for defining a maximum response count for said result set.

* * * * *